Aug. 31, 1948.　　　　H. WILSON　　　　2,448,066
PICKUP PARACHUTE HARNESS
Filed Dec. 11, 1945　　　　　　　　　　2 Sheets-Sheet 1
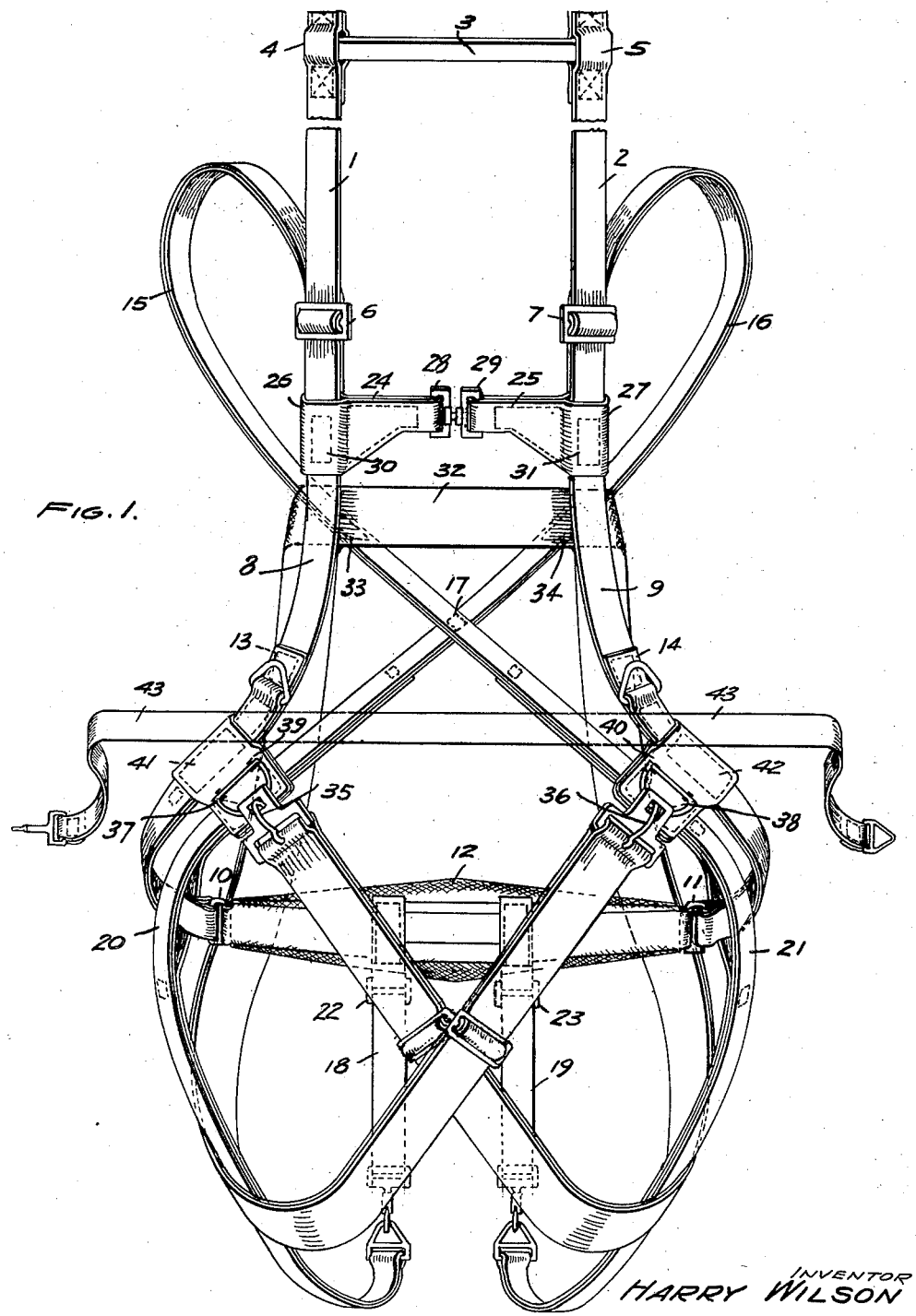

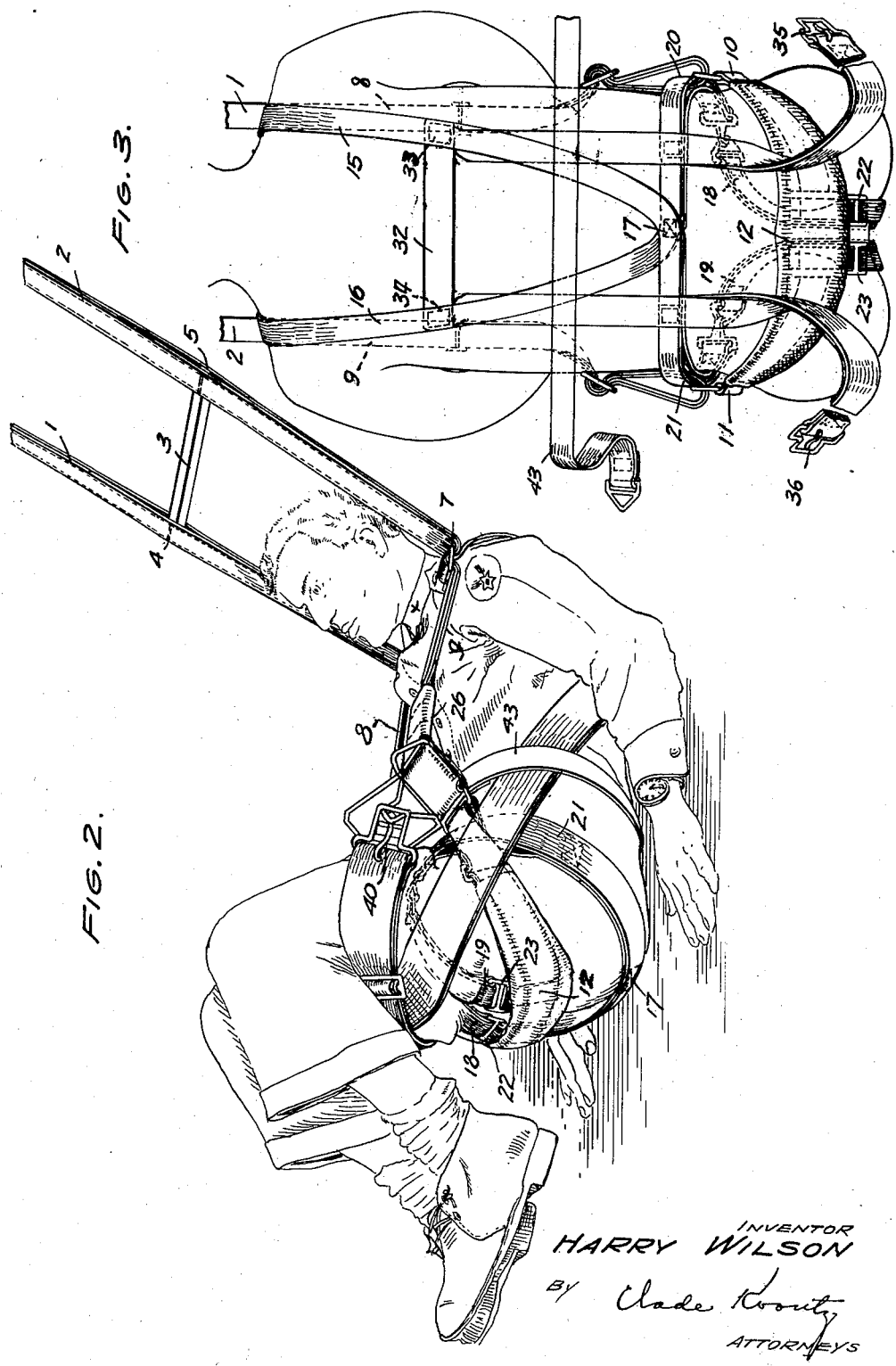

Patented Aug. 31, 1948

2,448,066

UNITED STATES PATENT OFFICE 2,448,066

PICKUP PARACHUTE HARNESS

Harry Wilson, United States Army

Application December 11, 1945,
Serial No. 634,199½

3 Claims. (Cl. 244—151)

(Granted under the act of March 3, 1883, as amended April 30, 1928; 370 O. G. 757)

The invention described herein may be manufactured and used by or for the Government for governmental purposes, without payment to me of any royalty thereon.

This invention relates to a human pick-up body harness and more particularly to a body harness of the type capable of being worn by a person when it is desired to effect a pick-up of the person on the ground by an aircraft while the aircraft is in flight.

In recent years, considerable development has been directed to the development of a body harness suitable for effecting the pick-up of a human from the ground by an aircraft while the aircraft is in flight. It has been known to pick up parcels, mail, etc., by an aircraft while the aircraft is in flight, but, considerable difficulty is encountered in picking up a human being by an aircraft while the aircraft is in flight due to the fact that a severe jolt is experienced by the person at the time of the initial ascent into the air coupled with the fact that the blood in the person's body rushes to the lower extremities of his body thereby causing him to lose consciousness. It is, therefore, the primary object of the invention to provide a body harness capable of being worn by a person to be picked up by a moving aircraft which will overcome the loss of consciousness at the time of initial ascent into the air when contact is made between the moving aircraft and the person to be picked up. As is usually the case, the person to be picked up by a moving aircraft is stranded in some inaccessible place where it is impossible to effect a landing of an aircraft to rescue the person thus stranded. It, therefore, becomes necessary for the person thus stranded to be rescued by an aircraft while same is in flight. The rescuing aircraft is provided with a conventional life line or rope, usually made of nylon or other elastic material, which can be unwound from a suitable winch carried by the rescuing aircraft. Through suitable mechanism the life line depending from the rescuing aircraft engages a portion of the body harness worn by the person to be rescued and, after contact has been made between the life line of the rescuing aircraft and the harness worn by the person to be rescued the winch is operated and the person to be rescued is reeled into the rescuing aircraft.

A further object of the invention is to provide a means whereby a conventional parachute harness can be equipped with means whereby the body of the person to be picked up will be maintained in a crouched position at the time of the initial ascent into the air, and which can be released following the initial ascent into the air thereby enabling the person to resume normal body position while being reeled into the rescuing aircraft.

Another object of the invention is to provide a device for the purposes above set forth which can be readily applied to standard make parachute harness.

Other objects of the invention will become apparent by reference to the following detailed description of the body harness and to the appended drawings in which:

Fig. 1 is a perspective view of my improved body harness embodying my invention.

Fig. 2 is a side elevation view showing the body harness worn by the person to be picked up and showing the position of the body at the time of initial ascent into the air.

Fig. 3 is a rear view of the body harness embodying my invention.

Referring now to the drawings, the body harness embodying my invention consists of a pair of parallel lift webs 1 and 2 provided with the conventional spreader bar 3 secured thereto in loops 4 and 5 formed in the upper portion thereof. Webs 1 and 2 are looped through conventional adjustable adaptors 6 and 7 respectively from whence the webs extend downwardly in parallel arrangement to form front straps 8 and 9 respectively. The front strap portions 8 and 9 extend downwardly and are looped through suitable adaptor rings 10 and 11 respectively which are secured to the seat portion 12 of the body harness. The free ends of front straps 8 and 9 are stitched to their respective web members after being looped through adaptor rings 10 and 11 as shown at 13 and 14 respectively. Back straps consisting of webs 15 and 16 are secured to the adjustable adaptors 6 and 7 respectively on the under side thereof and extend upwardly therefrom to form shoulder loop portions from whence they extend downwardly and are crossed and stitched together as shown at 17 from whence the webs 15 and 16 extend downwardly to pass through the legs of the wearer and are secured to straps 18 and 19 respectively which are stitched or otherwise secured to the seat portion 12 of the harness. Loop portions 20 and 21 are formed in webs 15 and 16 as shown in Figs. 1 and 3 of the drawing through which extends the lower portion of front straps 8 and 9 as clearly illustrated in the drawings. Conventional adjustable adaptors 22 and 23 are provided on straps 18 and 19 in order that the straps 18 and 19 may be shortened or lengthened, depending upon the size of the wearer of the body harness.

A breast strap consisting of a pair of webs 24 and 25, is looped around front straps 8 and 9 as shown at 26 and 27 and is provided at its inner ends with detachable connectors 28 and 29 as clearly shown in Fig. 1 of the drawing. If desired, the breast strap portion 24 and 25 can be stitched to the front strap 8 and 9 as shown at 30 and 31 respectively.

The novel feature of my invention consists essentially in providing the conventional body harness previously described herein with a web member 32 which is stitched as shown at 33 and 34 to back straps 15 and 16 respectively as shown in Figs. 1 and 3 of the drawing. The web member 32 consists of an elongated strap member which is adapted to maintain the body of the wearer of the body harness in a crouched position in a manner more fully described hereinafter. The free ends of web member 32 are each provided with a detachable connecting means 35 and 36 which engage D rings 37 and 38 respectively which are secured to the top side of plates 39 and 40 respectively as shown in Fig. 1 of the drawing. The plates 39 and 40 are made of any suitable material and are looped around front straps 8 and 9 and are stitched or otherwise secured thereto as shown at 41 and 42.

In use, the person to be picked up by the moving aircraft adjusts the body harness to his person through adjustable adaptors 6, 7, 22 and 23, and, after this has been accomplished, the free ends of web member 32 are slipped under the thighs of the wearer and crossed as shown in Figs. 1 and 2 of the drawing and fastened to their respective connecting members 39 and 40. The free ends of web member 32 thus secured will maintain the knees of the wearer of the body harness in an elevated position as shown in Fig. 2 of the drawing. If desired, a belt member 43 provided it has free ends with fastening means can be secured around the body of the wearer of the body harness after the free ends of the web member 32 have been secured to their respective fastening means.

From the above description it will be seen that I have provided a means whereby the body of the person to be picked up by the moving aircraft will be maintained in a crouched position on the ground prior to initial ascent into the air. This will prevent the sudden flow of blood from the upper portion of the person's body to his lower extremities and thereby preventing the person from losing consciousness.

I claim:

1. A body harness including straps extending upwardly at opposite sides both at the front and the rear of the wearer, the front straps terminating in lift webs, connecting means secured to said front straps, and means secured to said back straps for passing under the thighs of the wearer and detachably engaging said connecting means for maintaining the body of the wearer in a crouched position.

2. A body harness including front and rear straps extending upwardly at opposite sides of the wearer, said front straps terminating in lift webs, a D ring member secured to said front straps at opposite sides of the body of the wearer, an elongated strap member having its central portion secured to said back straps, the free ends of said strap member each adapted to cross under the thighs of the wearer and provided with a detachable connecting means for engagement with said D ring for maintaining the body of the wearer of the harness in a crouched position.

3. A body harness including front and rear straps and a seat portion, means connecting said front and rear straps to said seat portion, said front straps terminating in a pair of lift webs and said rear straps forming shoulder loops, D rings secured to said front straps at opposite sides of the body of the wearer, a strap secured to said back straps, the free ends of said strap members each passing over the seat portion and adapted to cross under the thighs of the wearer and being provided with connecting members adapted to engage said D rings for maintaining the body of the wearer in a crouched position.

HARRY WILSON.

REFERENCES CITED

The following references are of record in the file of this patent:

UNITED STATES PATENTS

| Number | Name | Date |
|---|---|---|
| 1,403,984 | Smith | Jan. 17, 1922 |
| 1,769,520 | Knight | July 1, 1930 |
| 2,289,372 | Manson | July 14, 1942 |

FOREIGN PATENTS

| Number | Country | Date |
|---|---|---|
| 649,884 | France | Sept. 10, 1928 |